United States Patent [19]

Tsunekawa

[11] Patent Number: 4,652,109
[45] Date of Patent: Mar. 24, 1987

[54] CAMERA LIGHT MEASURING SYSTEM WITH APERTURE CORRECTION FOR DIFFERENT MEASURING MODES

[75] Inventor: Tokuichi Tsunekawa, Kanagawa, Japan

[73] Assignee: Canon Kabushiki Kaisha, Japan

[21] Appl. No.: 734,758

[22] Filed: May 15, 1985

Related U.S. Application Data

[63] Continuation of Ser. No. 515,360, Jul. 19, 1983, abandoned.

[30] Foreign Application Priority Data

Jul. 22, 1982 [JP] Japan .................................. 57-127951
Jul. 22, 1982 [JP] Japan .................................. 57-127952

[51] Int. Cl.$^4$ .......................... G03B 7/081; G03B 7/20
[52] U.S. Cl. ..................................... 354/432; 354/455
[58] Field of Search ............... 354/429, 431, 432, 433, 354/434, 455

[56] References Cited

U.S. PATENT DOCUMENTS 4,306,787 12/1981 Fukuhara et al. .................... 354/432
4,420,252 12/1983 Nakauchi ......................... 354/432 X

*Primary Examiner*—William B. Perkey
*Attorney, Agent, or Firm*—Toren, McGeady and Goldberg

[57] ABSTRACT

In the disclosed system shifting light-measuring modes are shifted by restricting the view angle of a light sensitive element or by producing differences between a first light measuring circuit and a second light measuring circuit, each having a different light measuring range. A correction circuit determines aperture corrections for mode changes. When the exposure is controlled, the output of the light measurement is corrected by the output of the correction circuit.

7 Claims, 10 Drawing Figures

CAMERA LIGHT MEASURING SYSTEM WITH APERTURE CORRECTION FOR DIFFERENT MEASURING MODES

This is a continuation of application Ser. No. 515,360, filed July 19, 1983, now abandoned.

BACKGROUND OF THE INVENTION

1. Field of the Invention

This invention relates to a system for correcting the light measurement of a camera with an aperture correction factor upon changes in light measuring modes.

2. Description of the Prior Art

In general, the brightness of a scene to be photographed is not uniform. For example, its central portion may be brighter than the surrounding portion, or conversely the surrounding portion may be brighter than the central portion. When the difference between the brightnesses of these portions is small, one can use an average light measuring mode and still be assured that the measured light value does not deviate much from the true one. However, when the brightness of the various portions of the object differ to any great extent the overall view field light measuring mode does not always control exposures with any high degree of accuracy. For example, when the surrounding area in the finder image is far brighter than that of the central area, the light sensor is influenced significantly by the intensity of light coming from the surrounding area. Hence, the light measurement system tends not to recognize the brightness of the central area but only at the brightness of the surrounding area. In that case, the measured light value merely represents an evaluation of the brightness of the surrounding area of the finder image. Therefore, if the camera is allowed to automatically set an exposure parameter or parameters at this light value, it produces an improper exposure for the central portion. In most photographic situations, the object of principal interest lies in the center of view field of the finder. Therefore, an average light measuring mode cannot give an accurate light value and is not suited for use in general-purpose cameras. In such case, it is preferable to restrict the view angle of the light sensor.

For this reason, it has been the common practice for users to change between average and spot light measuring modes depending upon a given photographic situation. This has the advantage of improving the accuracy of evaluation in complex brightness situations. Another proposal to the same end involves a plurality of photosensitive elements arranged on a focal plane of a collection lens and giving variable weights to the respective outputs of these elements.

In the present state of art of light measuring, however, no one has yet developed an effective method for taking into account a change in value of the aperture correction factor when evaluating the object brightness as the measurement sensitivity pattern changes.

SUMMARY OF THE INVENTION

It is therefore an object of the present invention to eliminate the above-described drawbacks, and to provide a camera having a light measuring system with a view angle restricting member in front of a light sensor receptive of light passing through an objective lens, whereby the aperture correction is adjusted in accordance with change of the view angle for the light sensor resulting from the change in position of said restricting member.

Another object of the present invention is to provide a light measuring system having a first light sensor responsive to the brightness of an object of principal photographic interesst and a second light sensor responsive to the brightness of the environment surrounding the object, wherein a difference between the outputs of the first and second light sensors is detected based on which a value of the aperture correction factor for the used objective lens is determined by a correction factor, whereby the output of the correction circuit is fed back to correct the outputs of the first and second light sensors.

These and other objects, and features of the present invention will become apparent from the following description of embodiments thereof.

DESCRIPTION OF THE PREFERRED EMBODIMENTS

The present invention is described in connection with embodiments thereof by reference to the drawings.

Figure 1:
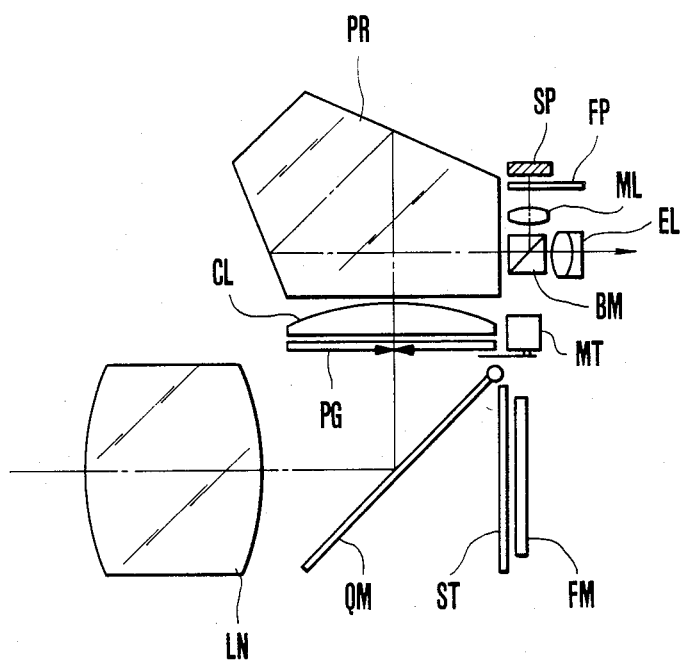
FIG. 1 is a vertical section view of a single lens reflex camera employing one form of the present invention.

FIG. 1 illustrates a single lens reflex camera having an objective lens LN, a quick return mirror QM, a focusing screen PG, a condenser lens CL, a penta prism PR, a beam splitter BM, an eye-piece EL, a collection lens ML for light measuring, a light sensor SP, a view angle restricting member FP in the form of a mask, an exposure value display MT, a shutter ST and a film FM.

Figure 2:
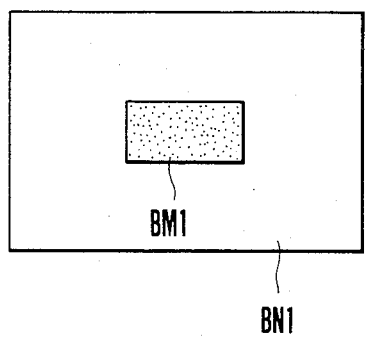
FIG. 2 is a plan view illustrating a light measurement sensitivity pattern for the camera of FIG. 1.

FIG. 2 illustrates two different light measurement sensitive regions in a picture frame which are selectively limited by the mask FP, or the central region at BM1 and the entire area of the frame at BN1.

Figure 3:
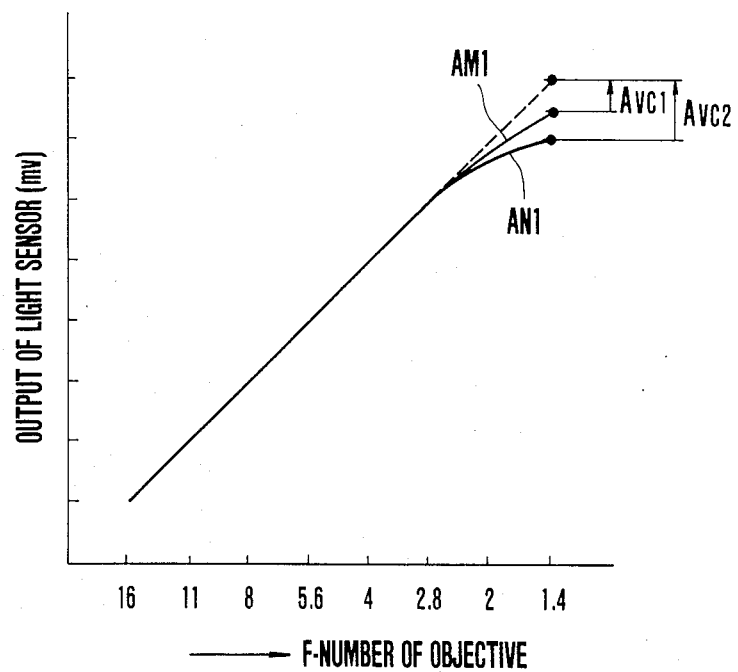
FIG. 3 is a graph illustrating response characteristics of the light sensors of sensitivity pattern of FIG. 2.

FIG. 3 illustrates the dependency of the variation with the F-number of the objective of the output of the light sensor SP on the light sensing areas BM1 and BN1. Letting AM1 denote the output of the light sensor SP when rendered responsive to the region AM1, and AN1 the output of the same light sensor SP when rendered responsive to the region BN1, it has been found that the required value of aperture correction factor Avc1 for the output AM1 is smaller than that of aperture correction factor Avc2 for the output AN1. It should be pointed out that these values Avc1 and Avc2 cannot be ignored when light measuring is carried out with the diaphragm aperture at full open or thereabout.

Figure 4:
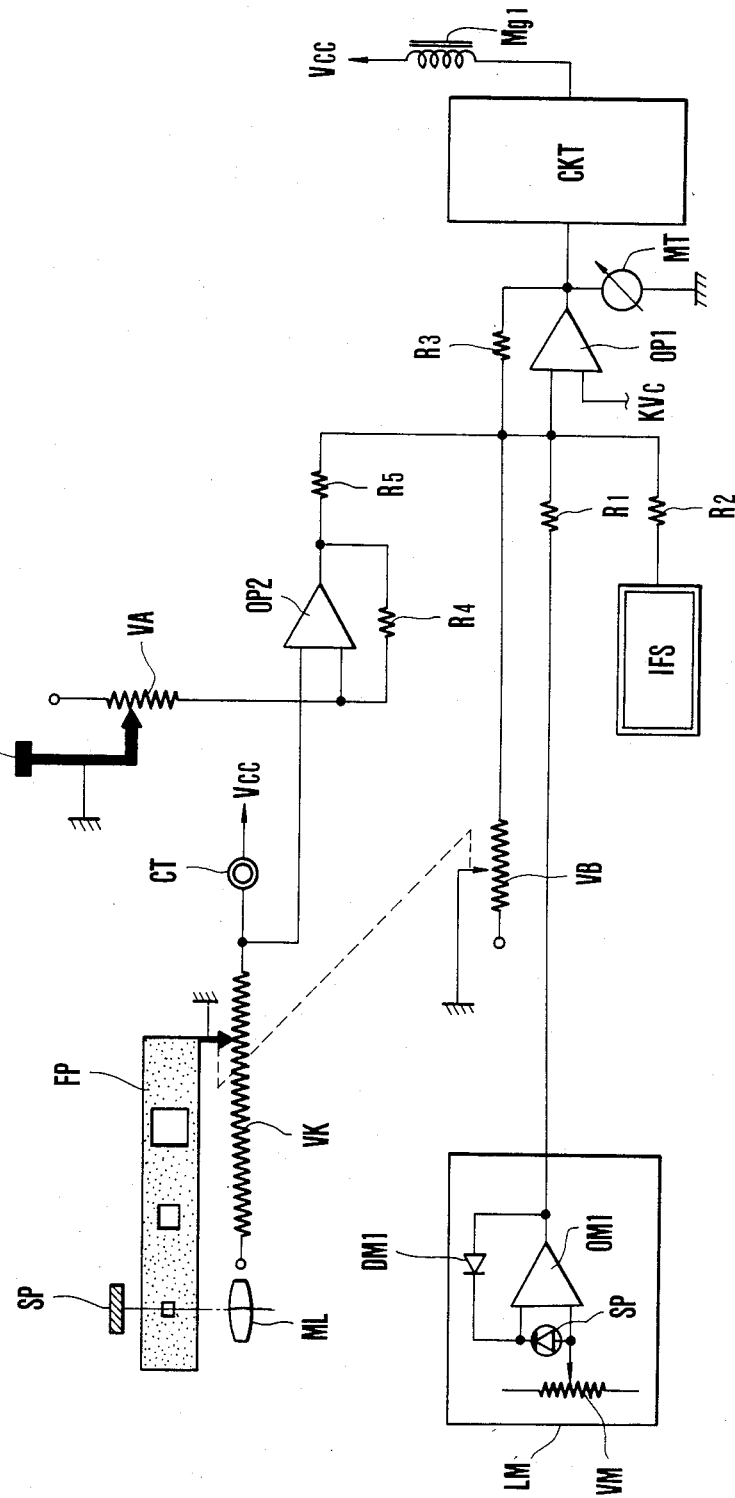
FIG. 4 is an electrical circuit diagram of a control circuit of the camera of FIG. 1.

A circuit for processing the output of the light sensor with addition of such aperture correction factor to obtain a highly accurate exposure is that illustrated in FIG. 4.

In FIG. 4, SP, FP and ML are the light sensors, view angle limiting mask and collection lens shown in FIG. 1, respectively. The view angle limiting mask FP is provided with an overall view field measuring aperture, a partial view field measuring aperture and a spot light measuring aperture, and is arranged to cooperate with a variable resistor VK having a resistance value adjusted in response to selection of the different apertures of the mask FP. Also cooperative with the mask FP is another variable resistor VB serving as a signal level correcting resistor. A correction circuit for determining the required value of the aperture correction factor includes the resistor VK cooperating with the view angle limiting mask FP, a constant current source CT, an operational amplifier OP2, operational resistors R4 and R5, and a variable resistor VA having a resistance value related to the maximum possible size of opening of the diaphragm aperture, or F-number, of the objective lens through a reading member AL. A light measuring circuit LM includes the photosensitive element SP, an operational amplifier OM1, a feedback diode DM1, and a level adjusting resistor VM. The outputs of the correction circuit, light measuring circuit LM and an exposure parameter setting circuits IFS are computed by operational resistors R1–R3 and an operational amplifier OP1. A meter MT displays the computing result. A control circuit CKT serves for which controls the operation of a solenoid Mg1 controlling a shutter in accordance with the exposure value. It is to be noted that the photosensitive element SP in the light measuring circuit LM is equivalent to the light sensor SP behind the mask FP.

The operation of the circuit of FIG. 4 is as follows:

When the view angle limiting mask FP is positioned as illustrated in FIG. 4, the spot light measuring mode is selected, and the resistor VK produces an output signal in the form of a voltage Vc. Responsive to this voltage Vc, the operational amplifier OP2 produces an output $V_{OP2}$ expressed as:

$$V_{OP2} = (1 + R4/R_{VA})Vc$$

Therefore, as the mask FP changes its position to select the partial measuring mode and the average measuring mode, the resistance value of the resistor VK is also adjusted so that the required value of aperture correction factor changes as a function of the light measurement sensitivity pattern and the maximum aperture size. Thus, it is made possible to adjust the aperture correction factor to a certain value for all the lenses of a large relative aperture.

Then, the output of the operational amplifier OP2, the output of the light measuring circuit LM and the output of the exposure parameter setting circuit IFS are processed through a computer composed of the operational amplifier OP1 and resistors R1, R2 and R3 to produce an exposure value which is displayed by the meter MT. On the other hand, the output of the computer is directed to the control circuit CKT to control the period of actuation of the shutter.

Though the foregoing embodiment has been described as using the mask FP in restricting the view angle, it is also possible to otherwise restrict the view angle by making use of three collection lenses of different focal lengths from one another.

The following description is of a second embodiment of the present invention and reference is made to the drawings.

Figure 5:
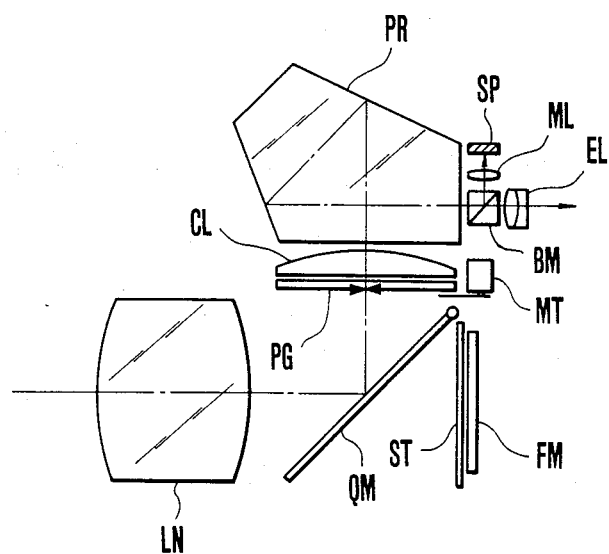
FIG. 5 is similar to FIG. 1 except that another embodiment of the invention is illustrated.
Figure 6:
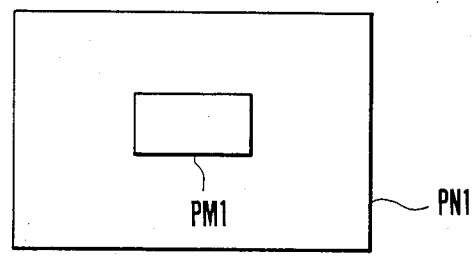
FIG. 6 is a plan view illustrating an example of arrangement of light sensors in the camera of FIG. 5.

FIG. 5 illustrates a single lens reflex camera different from the camera of FIG. 1 in that the mask is excluded, and the image receiving surfaces of two photosensitive elements SP are in the form illustrated in FIG. 6. The size of the entire area of the photosensitive elements SP is proportional to the size of the picture frame. An image receiving surface PM of a first photosensitive element covers a central area of the picture frame to sense the brightness of an image of an object of principal photographic interest, and PN1 denotes the image receiving surface of a second photosensitive element surrounding the one PM1 to sense the brightness of an image of the environment. The outputs of the first and second photosensitive elements which vary with the F-number of the objective lens are similar to those illustrated in FIG. 3. The required value of aperture correction factor Avc1 for the output AM1 of the first photosensitive element PM1 is smaller than that of aperture correction factor Avc2 for the output AN1 of the second photosensitive element PN1. As the size of opening of the diaphragm aperture approaches the maximum, these values of aperture correction factor Avc1 and Avc2 become more appreciable.

In a camera with an exposure control which adds the output of the second light sensor PN1 to the output of the first light sensor PM1 in a variable ratio, the required value of aperture correction factor must be changed from the Avc1 to the Avc2 depending upon the mixture ratio to achieve a great increase in the accuracy of exposure control. This is done by a control circuit of FIG. 7.

Figure 7:
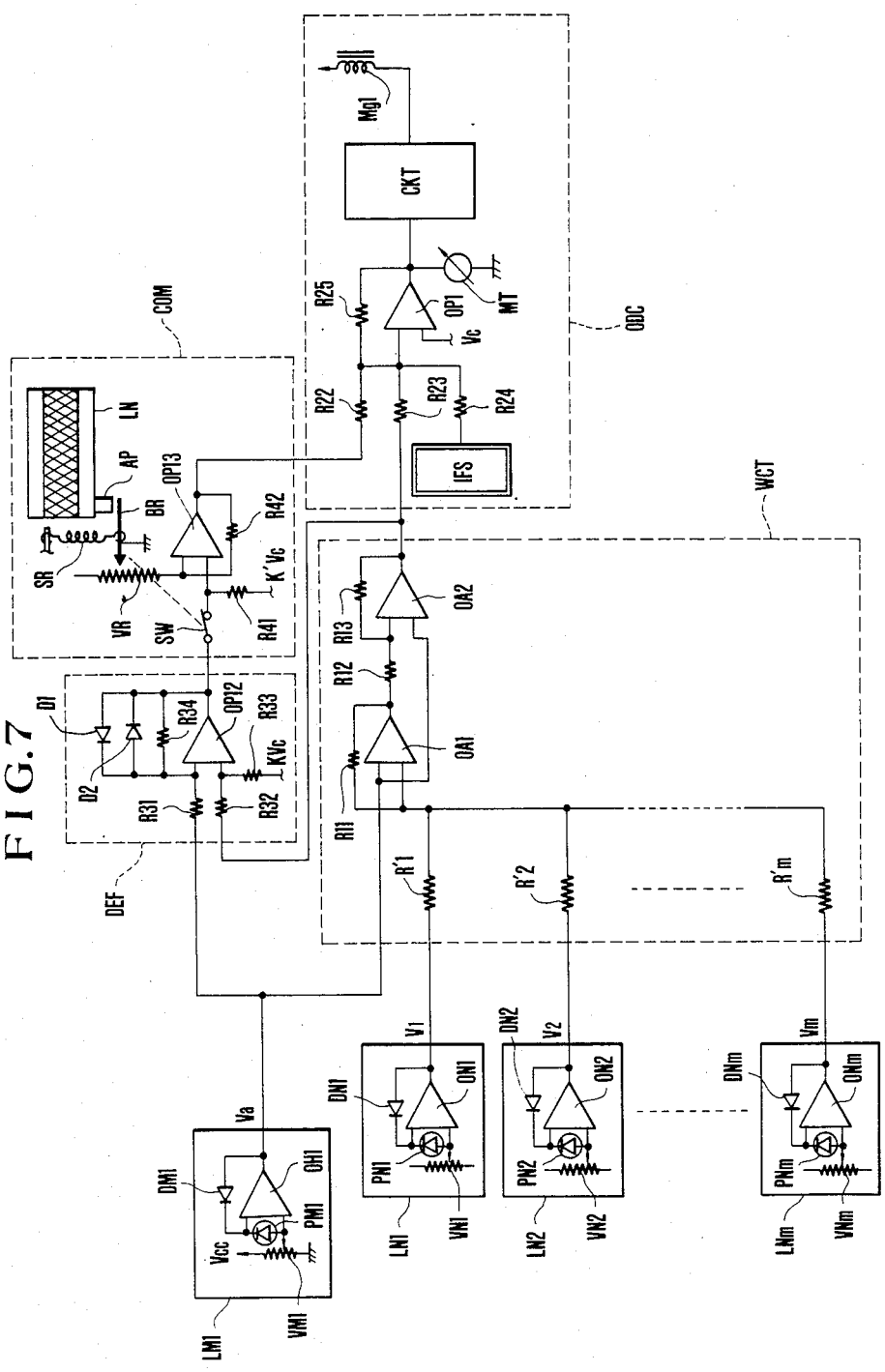
FIG. 7 is an electrical circuit diagram of a control circuit of the camera of FIG. 5.
Figure 8:
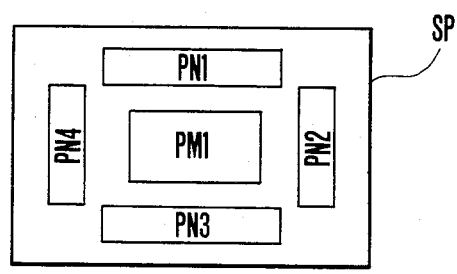
FIG. 8 is similar to FIG. 6 except that another example is illustrated.

In the circuit of FIG. 7, the number of photosensitive elements in the surrounding area of the picture frame is m, which may be 1 as in FIG. 6, or 4 as in FIG. 8. In FIG. 7, a light measuring circuit LM1 for the object of principal interest includes a photosensitive element PM1, an operational amplifier OM1, a feedback diode DM1, and a level adjusting resistor VM1. Light measuring circuits LN1 through LNm for the environment surrounding the object include photosensitive elements PN1–PNm, operational amplifiers ON1–ONm, feedback diodes DN1–DNm and level adjusting resistors VN1–VNm. A weighting circuit WCT comprises operational amplifiers OA1 and OA2 and resistors R'1 through R'm and R11 through R13. By this circuit WCT, the outputs of all the light measuring circuits LM1 and LN1–LNm are combined with the differentiation of their respective weights from one another. A difference circuit DEF includes resistors R31 through R34, clamp diodes D1 and D2, and an operational amplifier OP12 and produces an output signal corresponding to the output of the weighting circuit WCT. An aperture correction factor forming circuit COM includes resistors R41 and R42, an operational amplifier OP13, and a variable resistor VR with a slider BR in an adjusted position by a pin AP for the F-number of the objective lens. This circuit corrects the output of the difference circuit DEF for the aperture size at fully open aperture. A circuit ODC for computing an exposure value, displaying it, and controlling the operation of the exposure determining means, includes an exposure parameter setting circuit IFS, operational resistors R22 through R25, an operational amplifier OP1, a meter MT, a control circuit CKT, and a solenoid Mg1 controlling the exposure time.

The operation of the circuit of FIG. 7 is as follows: Responsive to the brightness of the central area of the picture frame, or the brightness of the object of principal photographic interest, the light measuring circuit LM1 produces an output Va. Responsive to the brightness of the portions of the surrounding area of the picture frame, or the brightnesses of the surroundings of the object, the light measuring circuits LN1-LNm produce outputs V1-Vm respectively. Then, responsive to these outputs Va and V1-Vm, the operational amplifier OA1 in the weighting circuit WCT produces an output $V_{OA1}$ expressed as:

$$V_{OA1} = Va + (Va - V1)\frac{R11}{R'1} + (Va - V2)\frac{R11}{R'2} +$$
$$\ldots + (Va - Vm)\frac{R11}{R'm}$$

Therefore, the output $V_{OA2}$ of the operational amplifier OA2 is $$V_{OA2} = Va + (V1 - Va)\frac{R11}{R'1} \cdot \frac{R13}{R12} +$$
$$(V2 - Va)\frac{R11}{R'2} \cdot \frac{R13}{R12} + \ldots + (Vm - Va)\frac{R11}{R'm} \cdot \frac{R13}{R12} =$$
$$Va + \sum_{n=1}^{m}(Vn - Va)\frac{R11}{R'n} \cdot \frac{R13}{R12}$$

Thus, the output of the operational amplifier OA2 carries brightness information with appropriate emphases on the various portions of the surrounding area depending upon the respective differences in brightness from the central area.

Then, the output Va of the light measuring circuit LM1 is subtracted from the output $V_{OA2}$ of the operational amplifier OA2 by the difference circuit DEF, leaving $$\sum_{n=1}^{m}(Vn - Va)\frac{R11}{R'n} \cdot \frac{R13}{R12}$$

in the form of a signal at the output of the operational amplifier OP12.

Figure 9:
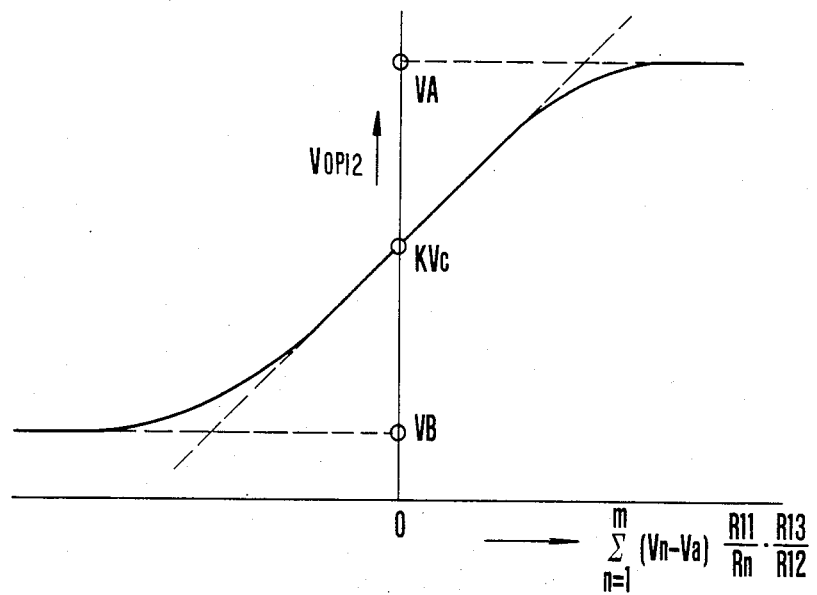
FIG. 9 is a graph illustrating variation of the output of the operational amplifier OP2 of FIG. 7.

FIG. 9 illustrates a variation of the output voltage $V_{OP12}$ of the operational amplifier OP12 with $$\sum_{n=1}^{m}(Vn - Va)\frac{R11}{Rn} \cdot \frac{R13}{R12}$$

where the output $V_{OP12}$ behaves as clamped at voltage levels $V_A$ and $V_B$ by the diodes D1 and D2. This clamping circuit serves as a protection circuit against a very large difference between the brightnesses of the object and the environment.

The output of the operational amplifier OP12 is applied to the aperture correction factor forming circuit COM, where it is corrected for the maximum size of the diaphragm aperture opening of the used objective lens. That is, the output $V_{OP13}$ of the operational amplifier OP13 takes the following value:

$$V_{OP13} = \left(1 + \frac{R42}{R_{VR}}\right) V_{OP12}$$

Thus the value of aperture correction factor can be made equal to constant times, the value of the output $V_{OP12}$ of the operational amplifier OP12, so that for all lenses of a large relative aperture, aperture correction at a certain rate can be carried out.

Figure 10:
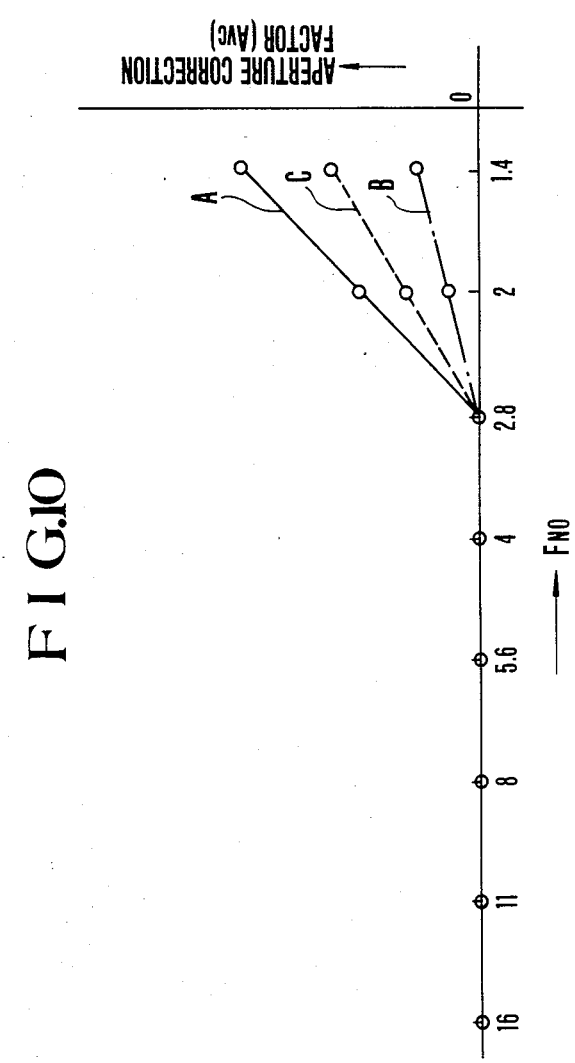
FIG. 10 is a graph illustrating variations of the output of the aperture correction factor forming circuit of FIG. 7.

How the rate of aperture correction varies is shown in FIG. 10 where A represents a photographic situation wherein the output of the surrounding area is very much larger than the output of the central area, B a situation wherein the outputs of the surrounding area and the central area are almost equal to each other, and C a situation wherein the output of the central area is far larger than the output of the surrounding area.

In FIG. 10, the aperture correction is assumed to take place only when the lens used is of larger relative aperture than F2.8. With the lens of F2.8 or smaller relative aperture, the pin AP is so short that the slider BR moves away from the resistance track of the variable resistor VR, and the switch SW is turned off. Then, the output of the operational amplifier OP3 is supplied with a predetermined bias voltage K'Vc, and information representing the aperture correction factor of the lens used is taken out. Then, the output of the operational amplifier OA2, the output of the operational amplifier OP13 which represents the aperture correction factor, and the output of the exposure parameter setting circuit IFS are computed by the operational amplifier OP1 to derive an exposure value which is displayed by the meter MT. The output of the operational amplifier OP1 is, on the other hand, routed to the control circuit CKT and the operation of the shutter is controlled through the solenoid Mg1.

As has been described in greater detail above, according to the present invention, the aperture correction factor can be adjusted to a proper value for the selected one of the various light measuring modes with the great advantage of making exposure control with high accuracy.

What I claim is:
1. A light measuring system for a camera, including:
(a) first light measuring means for measuring light passing through an objective lens having an aperture and for producing an electrical signal representing the brightness of a portion of an object to be photographed;
(b) a second light measuring means for measuring light entering through said objective lens and for producing electrical signals representing the brightness of a portion of the object different from the portion for said first light measuring means;
(c) first computing means for computing the output of said first light measuring means and the output of said second light measuring means and for producing an electrical signal representing the computed value;
(d) correcting means responsive to the difference between the output of said first computing means and the output of said first light measuring means for correcting information concerning the aperture of the objective lens on the basis of the difference, said means being arranged for producing an electri- cal signal representing a corrected aperture value; and (e) a second computing means for computing the output signal of said first computing means and the output signal of said correcting means and for producing an electrical signal representing the computed value for exposure control.

2. A system as in claim 1, wherein said first light measuring means has a photosensitive element for sensing the brightness of an object of principal photographic interest, and said second light measuring means has a plurality of photosensitive elements for sensing the brightnesses of respective different portions of the environment surrounding said object.

3. A light measuring system for a camera, including:
(a) first light measuring means for measuring light passing through an objective lens having an aperture and for producing an electrical signal representing the brightness of a portion of an object to be photographed;
(b) second light measuring means for measuring light entering said objective lens and for producing electrical signals representing the brightness of portions of the object different from the portion of said first light measuring means;
(c) first computing means for computing the output of said first light measuring means and the output of said second light measuring means and for producing an electrical signal representing the computed value;
(d) means for generating aperture information on the basis of said aperture of the objective lens;
(e) correcting means responsive to the difference between the output of said first computing means and the output of said first light measuring means for correcting the aperture information of the objective lens on the basis of the difference, said means being arranged for producing an electrical signal representing the corrected value, and
(f) second computing means for computing the output signal of said first computing means and the output signal of said correcting means and for producing an electrical signal representing the computed value for exposure control.

4. A system as described in claim 3, wherein said first light measuring means has a photosensitive element for sensing the brightness of an object of principal photographic interest, and said second light measuring means has a plurality of photosensitive elements for sensing the brightness of respective different portions of the environment surrounding said object.

5. A light measuring system for a camera, including:
(a) first light measuring means for measuring light passing through an objective lens and for sensing the brightness of an object of principal photographic interest, and for producing an electrical signal representing the brightness of a portion of the object to be photographed;
(b) second light measuring means for measuring light entering the objective lens and for producing electrical signals representing the brightnesses of the portion of the object to be photographed;
(c) first computing means for computing the difference between the output of said first light measuring means and the output of said second light measuring means and for producing an electrical signal representing the computed value;
(d) aperture information generating means for generating an electrical signal corresponding to the full-open F-number signal of the objective lens;
(e) correcting means responsive to the difference between the output of said first light measuring means and the output of said second light measuring means for correcting the aperture information of the objective lens on the basis of the difference, said means being arranged for producing an electrical signal representing the corrected value; and
(f) second computing means for computing the output signal of said first light measuring means and second light measuring means and the output signal of said correcting means and for producing an electrical signal representing the computed value for exposure control.

6. A light measuring system for a camera, including:
(a) first light measuring means for measuring light passing through an objective lens and for producing an electrical signal representing the brightness of the object;
(b) second light measuring means for measuring light passing through the objective lens and for producing an electrical signal representing the brightness of the object, said second light measuring means having a light measuring range different from that of said first light measuring means; and
(c) correcting means for producing a correcting signal to correct an aperture correction factor of the objective lens, said correcting means producing said correcting signal in response to the output of said first light measuring means and the output of said second light measuring means.

7. A system according to claim 6, wherein the correcting signal of said correcting means is produced on the basis of the difference between the outputs of said first and second light measuring means.

* * * * *